(12) United States Patent
Li

(10) Patent No.: US 12,299,031 B2
(45) Date of Patent: May 13, 2025

(54) AUDIO GENERATION METHOD, RELATED APPARATUS, AND STORAGE MEDIUM

(71) Applicant: Petal Cloud Technology Co., Ltd., Dongguan (CN)

(72) Inventor: Nian Li, Shenzhen (CN)

(73) Assignee: Petal Cloud Technology Co., Ltd., Dongguan (CN)

( * ) Notice: Subject to any disclaimer, the term of this patent is extended or adjusted under 35 U.S.C. 154(b) by 0 days.

(21) Appl. No.: 17/794,540

(22) PCT Filed: Oct. 27, 2020

(86) PCT No.: PCT/CN2020/124100
§ 371 (c)(1),
(2) Date: Jul. 21, 2022

(87) PCT Pub. No.: WO2021/147420
PCT Pub. Date: Jul. 29, 2021

(65) Prior Publication Data
US 2023/0054740 A1 Feb. 23, 2023

(30) Foreign Application Priority Data
Jan. 22, 2020 (CN) .......................... 202010073835.5

(51) Int. Cl.
*G06F 16/683* (2019.01)
*G06F 16/632* (2019.01)

(52) U.S. Cl.
CPC .......... *G06F 16/685* (2019.01); *G06F 16/632* (2019.01)

(58) Field of Classification Search
CPC .... G06F 16/685; G06F 16/632; G06F 16/638; G10H 2220/011; G10H 2240/141; G10H 2250/455; G10H 1/0008; G10L 13/06
See application file for complete search history.

(56) References Cited

U.S. PATENT DOCUMENTS

2006/0199156 A1 9/2006 Kogo
2007/0162437 A1* 7/2007 Hwang ................... G06F 16/68
2011/0087671 A1* 4/2011 Lee ........................ G06F 16/345
707/741

(Continued)

FOREIGN PATENT DOCUMENTS

CN 104391980 A 3/2015
CN 104778220 A 7/2015

(Continued)

OTHER PUBLICATIONS

Knowledge Is Power "Let Them Sing it for you WORKS 2016," XP093029877, Total 2 pages (Nov. 19, 2016).

(Continued)

*Primary Examiner* — Cam Y T Truong
(74) *Attorney, Agent, or Firm* — Leydig, Voit & Mayer, Ltd.

(57) ABSTRACT

Embodiments of this application provide an audio generation method, a related apparatus, and a storage medium, to provide a better audio generation solution for a user. In embodiments of this application, a text is obtained, a song clip corresponding to the text is obtained through matching, and the song clip is used as audio corresponding to the text. In this way, the text can be expressed in a manner of the song clip.

15 Claims, 8 Drawing Sheets

(56) References Cited

U.S. PATENT DOCUMENTS

| | | | |
|---|---|---|---|
| 2011/0119254 A1* | 5/2011 | Brown | G06F 16/3344 |
| | | | 707/765 |
| 2013/0191122 A1* | 7/2013 | Mason | G10L 15/26 |
| | | | 704/231 |
| 2014/0115465 A1* | 4/2014 | Lee | G06F 3/0482 |
| | | | 715/716 |
| 2015/0199958 A1* | 7/2015 | Moore | G10L 13/08 |
| | | | 704/260 |
| 2016/0006679 A1* | 1/2016 | Williams | H04W 4/14 |
| | | | 455/466 |
| 2017/0332020 A1* | 11/2017 | Ouyang | G06T 5/20 |
| 2018/0103000 A1 | 4/2018 | Guthery et al. | |
| 2018/0210952 A1* | 7/2018 | Takano | G06F 16/61 |
| 2018/0357312 A1* | 12/2018 | Heitz, III | G06F 16/683 |
| 2020/0211531 A1* | 7/2020 | Kumar | G06F 16/685 |
| 2021/0191973 A1* | 6/2021 | Marchini | G06F 16/639 |
| 2023/0176809 A1* | 6/2023 | Panchaksharaiah | G06F 16/639 |
| | | | 700/94 |

FOREIGN PATENT DOCUMENTS

| | | |
|---|---|---|
| CN | 106971703 A | 7/2017 |
| CN | 107707828 A | 2/2018 |
| CN | 107799119 A | 3/2018 |
| CN | 108268530 A | 7/2018 |
| CN | 108806656 A | 11/2018 |
| CN | 108877766 A | 11/2018 |
| CN | 109377988 A | 2/2019 |
| CN | 110110136 A | 8/2019 |
| CN | 111339352 A | 6/2020 |
| JP | 2005004107 A | 1/2005 |

OTHER PUBLICATIONS

Gramfors et al., "Emotionally expressive song synthesis using formants and syllables," DD143X, XP093029881, pp. 1-27 (Mar. 2014).

* cited by examiner

[title:lao fang zi][artist:Liu Hegang][total:233406]
[26728,7659]<0,360,0>yin<360,590,0>yin<360,590,0>yue<1359,540,0>yue<1899,500,0>kan<2399,1240,0>jian<3639,460,0>le
ge<5219,690,0>cun<5909,460,0>cun<6369,1290,0>zhuang
[35307,7530]<0,520,0>cun<520,590,0>qian<1110,510,0>cun<1620,440,0>hou<2060,610,0>dou<2670,1360,0>shi<4030,240,0>
xi<5140,330,0>de<5470,1210,0>mu<6680,850,0>yang
[44177,7749]<0,340,0>jing<340,1259,0>jing<1599,410,0>de 29,1150,0>pang<4279,800,0>
<5359,500,0>xiao<5859,520,0>huo<6379,1370,0>ban
[52786,8410] Time for locating each character g<1210,430,0>xia<1640,470,0>mian<2110,1160,0>zhuo<3270,1070,0>mi<4340,407
[61576,8380] 0,430,0>mang<1450,360,0>mang<1810,780,0>zou<2590,1240,0>jin<3830,390,0>
ge<5500,340,0>xiao<5840,460,0>cun<6300,2080,0>zhuang
[70156,8290]<0,680,0>cun<680,310,0>zhuang<990,530,0>li<1520,450,0>mian<1970,550,0>you<2520,1230,0>yi<3750,430,0>jian
qie<4960,310,0>de<5270,530,0>xiao<5800,610,0>cao<6410,1880,0>fang
[78626,8280]<0,710,0>fang<710,1430,0>li<2140,1320,0>qiang<3460,910,0>shang<4370,470,0>gua<4840,510,0>zhe<5350,750,0
<6530,1750,0>xiang
[87186,8560]<0,960,0>na<960,200,0>shi<1160,390,0>wo<1550,700,0>de<2250,1150,0>die<3400,1070,0>he<4470,4090
[95946,3900]<0,3900,0>ai
[100036,14070]<0,330,0>zhe<330,400,0>shi<730,430,0>wo<1160,770,0>de<1930,1630,0>jia<3560,2900,0>xiang<6460,250,
<7060,670,0>yang<7730,930,0>wo<8660,400,0>de<9060,1650,0>di<10710,3360,0>fang
[114376,13020]<0,770,0>wo<770,190,0>de<960,310,0>zu<1270,790,0>xian<2060,650,0>hai<2710,950,0>mai<3660,2840,0
<6760,330,0>pian<7090,500,0>shen<7590,950,0>qing<8540,400,0>de<8940,1300,0>tu<10240,400,0>di<10640,

[Title:qingqing ming yu shang][artist:Xu Song][total:201623]
[30068,1655]<0,411,0>chuang<415,204,0>tou<622,618,0>chu<1244,411,0>xiao[31738,1655]<0,411,0>xi<1
[33401,2277]<0,826,0>yun<829,826,0>zi<1659,618,0>yao
[35882,6942]<0,308,0>xiang<415,411,0>ni<829,308,0>dang<1244,308,0>nian<1659,411,0>he<2073,308,0>feng<2488,411,0>wei<2903,41
<3732,204,0>yi<3939,3003,0>jiao
[43307,1655]<0,411,0>mu<414,204,0>diao<622,618,0>liu<1244,411,0>jin
[44997,1656]<0,412,0>sui<415,204,0>yue<622,619,0>lian<1244,412,0>yi
[46665,2484]<0,411,0>qi<415,411,0>nian<829,412,0>qian<1244,411,0>feng<1659,825,0>bi
...
[85617,3625]<0,411,0>zhe<415,411,0>ba<415,411,0>ji<1244,411,0>ju<830,411,0>ji<1244,411,0>dao<1659,411,0>ni<2073,411,0>shem<2488,1137,0>pang
[89388,6424]<0,411,0>ba<415,411,0>ni<829,204,0>zui<1244,308,0>ai<1659,411,0>de<2073,412,0>ge<2488,204,0>lai<2903,41
<4147,2277,0>chang[109523,1655]<0,411,0>yuan<415,204,0>fang<622,618,0>you<1244,411,0>qin[11210,1655]<0,411,0>qiao<414,204,0>
<1244,411,0>ting
[112958,22277]<0,411,0>sheng<415,411,0>sheng<829,412,0>cui<1244,411,0>tian<1659,618,0>yu

FIG. 6

AUDIO GENERATION METHOD, RELATED APPARATUS, AND STORAGE MEDIUM

CROSS-REFERENCE TO RELATED APPLICATIONS

This application is a national stage of International Application No. PCT/CN2020/124100, filed on Oct. 27, 2020, which claims priority to Chinese Patent Application No. 202010073835.5, filed on Jan. 22, 2020. Both of the aforementioned applications are hereby incorporated by reference in their entireties.

TECHNICAL FIELD

This application relates to the communication field, and in particular, to an audio generation method, a related apparatus, and a storage medium.

BACKGROUND

Text to speech (TTS) is a computer interaction technology. Currently, it is widely used in scenarios such as voice assistant, smart speaker, and map navigation.

In the conventional technology, when a speech synthesis technology is executed, pronunciations of some characters are usually manually recorded in a database in advance. When a piece of text needs to be converted into speech, speech corresponding to each character may be found in the database, and speech of all characters in the text is synthesized into speech corresponding to the text. The effect of this method is merely to read a piece of text in a manner similar to a human voice.

SUMMARY

Embodiments of this application provide an audio generation method, a related apparatus, and a storage medium, to use a song clip corresponding to a text as audio corresponding to the text. Compared with a solution in which the text is merely read in a manner similar to a human voice, embodiments of this application can provide a better audio generation solution.

According to a first aspect, an embodiment of this application provides an audio generation method. The method is performed by a server. The server obtains a text, and if a song clip corresponding to the text is obtained through matching, uses the song clip as audio corresponding to the text. Lyrics of the song clip are the same as the text. In this way, because the song clip corresponding to the text is obtained through matching, the song clip corresponding to the text may be used as the audio corresponding to the text, so that the text may be played by using the song clip, to provide a better audio generation solution for a user.

In a possible implementation, if no song clip corresponding to the text is obtained through matching, the method further includes: dividing the text into at least two subtexts according to a preset rule, where the at least two subtexts include a first subtext and a second subtext, the first subtext includes one or more consecutive characters in the text, and the second subtext includes one or more consecutive characters in the text except the characters included in the first subtext; and if a song clip corresponding to the first subtext and a song clip corresponding to the second subtext are obtained through matching, splicing the song clip corresponding to the first subtext and the song clip corresponding to the second subtext, to obtain the audio corresponding to the text. In this way, if no song clip corresponding to the text is obtained through matching, the text may be divided into subtexts for song matching, and then song clips corresponding to the subtexts are spliced into audio corresponding to the text. This can improve flexibility of the solution.

In a possible implementation, the dividing the text into at least two subtexts according to a preset rule includes: allocating remaining characters in the text except the last character as the first subtext, and allocating the last character in the text as the second subtext.

In a possible implementation, if a character included in the first subtext is the same as a character included in the second subtext, the song clip corresponding to the first subtext and the song clip corresponding to the second subtext meet any one of the following content: the song clip corresponding to the first subtext and the song clip corresponding to the second subtext are from two different songs; the song clip corresponding to the first subtext and the song clip corresponding to the second subtext are two different song clips of a same song, and the song clip corresponding to the first subtext and the song clip corresponding to the second subtext are a same song clip of the same song. This can improve flexibility of the solution.

In a possible implementation, if no song clip corresponding to the first subtext is obtained through matching, the method further includes: allocating remaining characters in the text except the last two characters as a third subtext, and allocating the last two characters in the text as a fourth subtext; and if a song clip corresponding to the third subtext and a song clip corresponding to the fourth subtext are obtained through matching, splicing the song clip corresponding to the third subtext and the song clip corresponding to the fourth subtext, to obtain the audio corresponding to the text. Because a quantity of characters to be matched is reduced from a tail each time, an objective that a quantity of subtexts obtained through division is relatively small can be achieved.

In a possible implementation, if the song clip corresponding to the first subtext is obtained through matching, but no song clip corresponding to the second subtext is obtained through matching, the method further includes: dividing the second subtext into at least two subtexts, where the at least two subtexts include a fifth subtext and a sixth subtext; obtaining, through matching, a song clip corresponding to the fifth subtext, and obtaining, through matching, a song clip corresponding to the sixth subtext; and splicing the song clip corresponding to the first subtext, the song clip corresponding to the fifth subtext, and the song clip corresponding to the sixth subtext, to obtain the audio corresponding to the text. This can improve flexibility of the solution.

In a possible implementation, the obtaining, through matching, a song clip corresponding to the text includes: obtaining, through matching, one or more songs corresponding to the text, where lyrics of the song include the text; if there are a plurality of songs, selecting one song from the plurality of songs as a target song according to the preset rule or based on user selection; and capturing, from the target song, the song clip corresponding to the text. This can improve flexibility of the solution.

In a possible implementation, the selecting one song from the plurality of songs as a target song according to the preset rule includes: selecting one song from the plurality of songs as the target song based on one or more of the following contents of each of the plurality of songs: playback times, a singer, and a style of the song. In this way, a song with more playback times or a style relatively similar to a style preferred by a user may be selected.

In a possible implementation, the obtaining a text includes: obtaining a paragraph input by a user, where the paragraph includes at least one punctuation mark therein; and dividing the paragraph into at least two texts according to the punctuation mark included in the paragraph. In this way, after a plurality of texts are obtained through division according to the punctuation mark, a song clip is obtained through matching for each text, so that audio corresponding to the paragraph can better conform to semantics of the paragraph.

According to a second aspect, an audio generating method is provided. The method is performed by an electronic device. In the method, the electronic device sends a text to a server, and receives audio that corresponds to the text and that is returned by the server. The audio corresponding to the text may be a song clip of a song, or may be formed by splicing a plurality of song clips. Any two song clips of the plurality of song clips may be from a same song, or may be from two different songs.

In a possible implementation, the electronic device sends a paragraph to the server, where the paragraph includes at least one punctuation mark.

Corresponding to any communication method in the first aspect and the second aspect, this application further provides a communication apparatus. The communication apparatus may be any transmit-end device or receive-end device that performs data transmission in a wireless manner, for example, a communication chip, a terminal device, or a server. In a communication process, a transmit-end device and a receive-end device are relative concepts. In some communication processes, the communication apparatus may be used as the foregoing server or a communication chip that may be used in the server. In some communication processes, the communication apparatus may be used as the foregoing electronic device or a communication chip that may be used in the electronic device.

According to a third aspect, a communication apparatus is provided. The communication device includes a transceiver unit and a processing unit, to perform any implementation of any communication method according to the first aspect and the second aspect. The transceiver unit is configured to perform functions related to sending and receiving. Optionally, the transceiver unit includes a receiving unit and a sending unit. In a design, the communication apparatus is a communication chip, and the transceiver unit may be an input/output circuit or a port of the communication chip.

In another design, the transceiver unit may be a transmitter and a receiver, or the transceiver unit may be a transmitting machine and a receiving machine.

Optionally, the communication apparatus further includes modules that may be configured to perform any implementation of any communication method according to the first aspect and the second aspect.

According to a fourth aspect, a communication apparatus is provided. The communication apparatus is the electronic device or the server. The communication device includes a processor and a memory. Optionally, the communication apparatus further includes a transceiver. The memory is configured to store a computer program or instructions. The processor is configured to invoke and run the computer program or the instructions from the memory. When the processor executes the computer program or the instructions in the memory, the communication apparatus is enabled to perform any implementation of any communication method in the first aspect and the second aspect.

Optionally, there are one or more processors, and there are one or more memories.

Optionally, the memory may be integrated with the processor, or the memory and the processor are disposed separately.

Optionally, the transceiver may include a transmitter and a receiver.

According to a fifth aspect, a communication apparatus is provided, including a processor. The processor is coupled to a memory, and may be configured to perform the method according to either of the first aspect and the second aspect and any one of the possible implementations of the first aspect and the second aspect. Optionally, the communication apparatus further includes the memory. Optionally, the communication apparatus further includes a communication interface, and the processor is coupled to the communication interface.

In an implementation, the communication apparatus is an electronic device. When the communication apparatus is the electronic device, the communication interface may be a transceiver or an input/output interface. Optionally, the transceiver may be a transceiver circuit. Optionally, the input/output interface may be an input/output circuit.

In an implementation, the communication apparatus is a server. When the communication apparatus is the server, the communication interface may be a transceiver or an input/output interface. Optionally, the transceiver may be a transceiver circuit. Optionally, the input/output interface may be an input/output circuit.

In still another implementation, the communication apparatus is a chip or a chip system. When the communication apparatus is the chip or the chip system, the communication interface may be an input/output interface, an interface circuit, an output circuit, an input circuit, a pin, a related circuit, or the like on the chip or the chip system. The processor may alternatively be embodied as a processing circuit or a logic circuit.

According to a sixth aspect, a system is provided. The system includes the electronic device and the server.

According to a seventh aspect, a computer program product is provided. The computer program product includes a computer program (which may also be referred to as code or instructions). When the computer program is run, a computer is enabled to perform the method according to any possible implementation of the first aspect, or the computer is enabled to perform the method according to any implementation of the first aspect and the second aspect.

According to an eighth aspect, a computer-readable storage medium is provided. The computer-readable storage medium stores a computer program (which may also be referred to as code or instructions). When the computer program is run on a computer, the computer is enabled to perform the method according to any possible implementation of the first aspect, or perform the method according to any implementation of the first aspect and the second aspect.

According to a ninth aspect, a processing apparatus is provided, including an input circuit, an output circuit, and a processing circuit. The processing circuit is configured to: receive a signal by using the input circuit, and transmit a signal by using the output circuit, so that the method according to any one of the first aspect and the second aspect and the possible implementations of the first aspect and the second aspect is implemented.

In a specific implementation process, the processing apparatus may be a chip, the input circuit may be an input pin, the output circuit may be an output pin, and the processing circuit may be a transistor, a gate circuit, a trigger, any logic circuit, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and the various circuits are not limited in embodiments of this application.

BRIEF DESCRIPTION OF DRAWINGS

FIG. 6 is a schematic diagram of locations at which subtexts appear in lyrics of a song according to an embodiment of this application;

DESCRIPTION OF EMBODIMENTS

Figure 1:
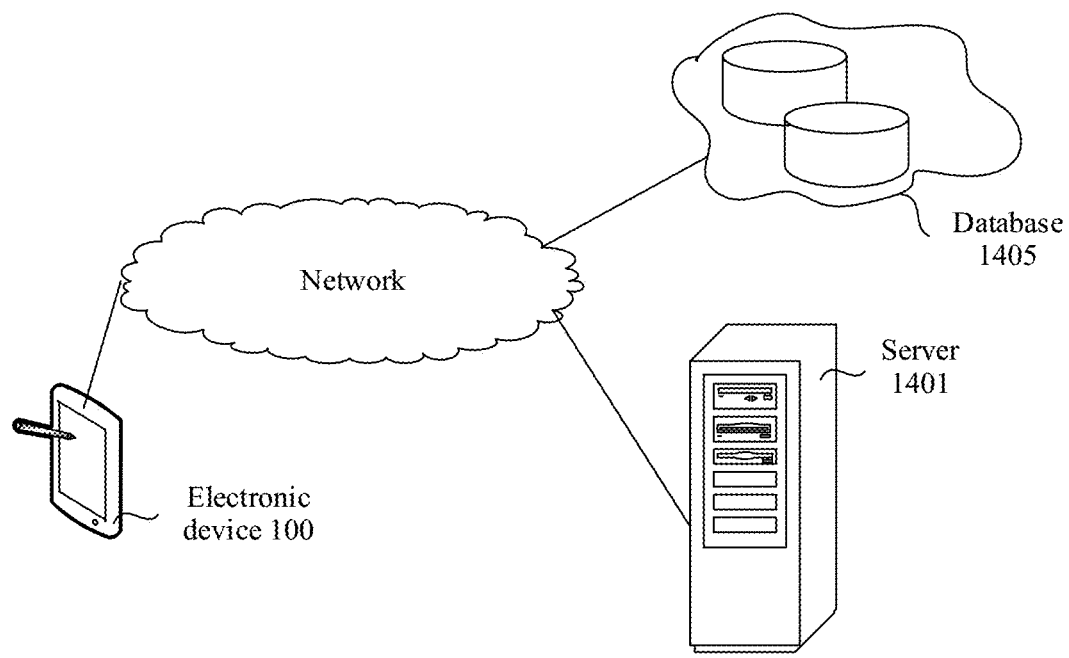
FIG. 1 is a schematic diagram of a system architecture according to an embodiment of this application.

FIG. 1 is a schematic diagram of an example of a system architecture according to an embodiment of this application. As shown in FIG. 1, the system includes an electronic device 100 and a server 1401. Optionally, one or more databases 1405 are further included. The database 1405 may be configured to store content such as a song. The database 1405 in this embodiment of this application may be disposed on the cloud server 1401.

In some embodiments of this application, the electronic device may be a portable electronic device, such as a mobile phone, a tablet computer, a wearable device (for example, a smartwatch), or a vehicle-mounted device with a wireless communication function, that includes a function such as a personal digital assistant and/or a music player. An example embodiment of the portable electronic device includes but is not limited to a portable electronic device using iOS®, Android®, Microsoft®, or another operating system. The portable electronic device may alternatively be a laptop or the like. It should be further understood that, in some other embodiments of this application, the electronic device may alternatively be a desktop computer.

Figure 2:
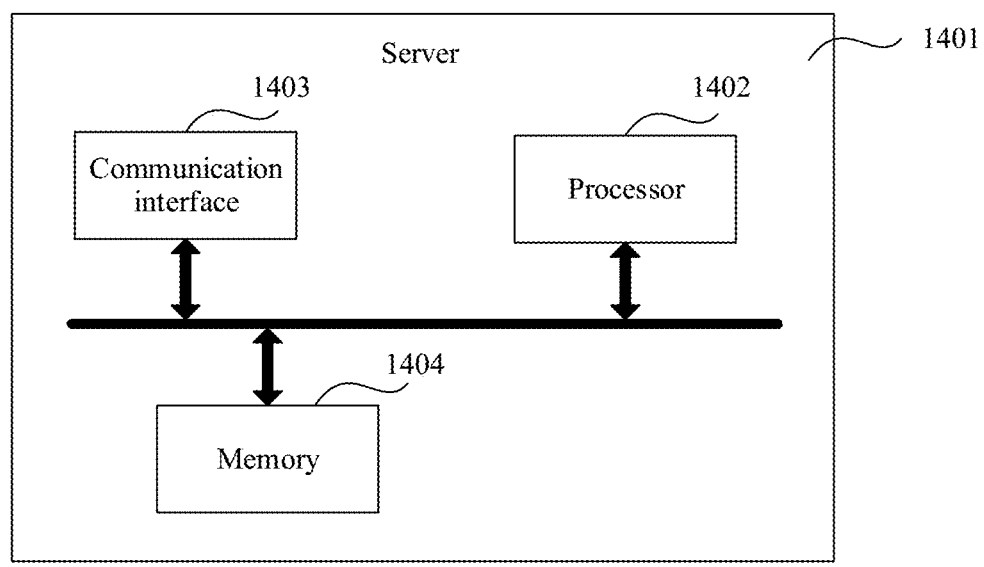
FIG. 2 is a schematic structural diagram of a server according to an embodiment of this application.

FIG. 2 is a schematic structural diagram of an example of a server according to an embodiment of this application. As shown in FIG. 2, the server 1401 includes a communication interface 1403, a processor 1402, and a memory 1404. Further, the server 1401 may further include a bus system. A processor 1402, a memory 1404, and a communication interface 1403 may be connected through the bus system.

The processor 1402 may be a chip. For example, the processor 1402 may be a field programmable gate array (FPGA), an application-specific integrated circuit (ASIC), a system on chip (SoC), a central processing unit (CPU), a network processor (NP), a digital signal processor (DSP), a micro controller unit (MCU), a programmable logic device (PLD), or another integrated chip.

It should be noted that the processor 1402 in embodiments of this application may be an integrated circuit chip, and has a signal processing capability. In an implementation process, steps in the foregoing method embodiments can be implemented by using a hardware integrated logical circuit in the processor, or by using instructions in a form of software. The foregoing processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, steps, and logical block diagrams that are disclosed in embodiments of this application. The general-purpose processor may be a microprocessor, or the processor may be any conventional processor or the like. The steps in the methods disclosed with reference to embodiments of this application may be directly performed and completed by a hardware decoding processor, or may be performed and completed by using a combination of hardware in the decoding processor and a software module. The software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the foregoing methods in combination with hardware of the processor.

The memory 1404 may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) and is used as an external cache. For example but not limitation, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus dynamic random access memory (DR RAM). It should be noted that the memory in the system and the method described in this specification is intended to include, but not limited to, these memories and any memory of another proper type.

The communication interface 1403 may be configured to input and/or output information. In an optional implementation solution, when the server includes a transceiver, the method steps performed by the communication interface 1403 may also be performed by the transceiver.

The memory 1404 is configured to store computer-executable instructions for executing embodiments of this application, and the processor 1402 controls the execution. The processor 1402 is configured to execute the computer-executable instructions stored in the memory 1404, to implement an audio generation method provided in embodiments of this application. Alternatively, optionally, in this embodiment of this application, the processor 1402 may perform processing-related functions in the audio generation method provided in the following embodiments of this application.

The communication interface 1403 is responsible for communicating with another device or another communication network. This is not specifically limited in this embodiment of this application. Optionally, the computer-executable instructions in this embodiment of this application may also be referred to as application program code. This is not specifically limited in this embodiment of this application.

Figure 3:
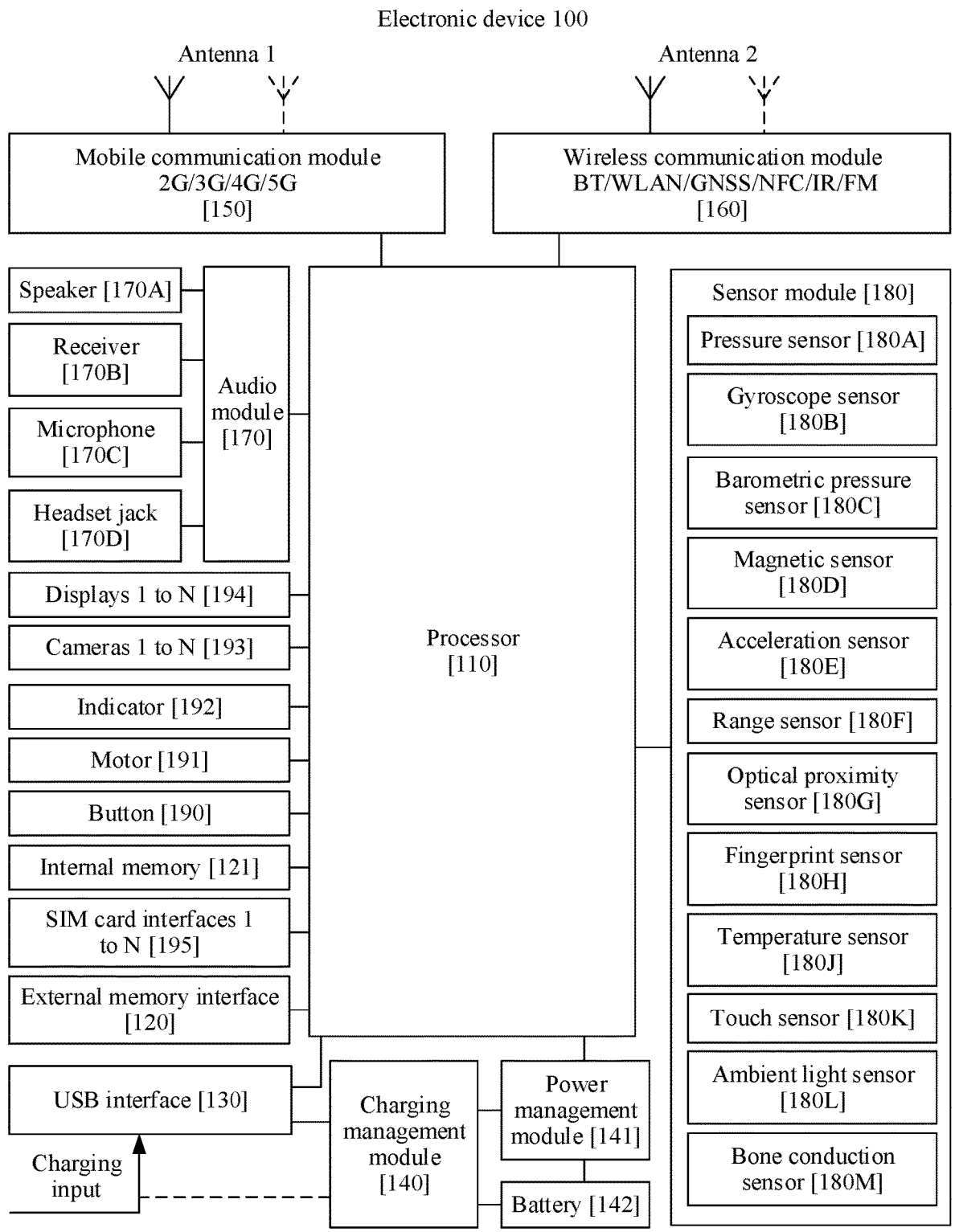
FIG. 3 is a schematic structural diagram of an electronic device according to an embodiment of this application.

FIG. 3 is a schematic structural diagram of an example of an electronic device. A mobile phone is used as an example for display in FIG. 3. It should be understood that the electronic device 100 shown in figure is merely an example, and the electronic device 100 may have more or fewer components than those shown in figure, may combine two or more components, or may have different component configurations. Components shown in figure may be implemented in hardware, software, or a combination of hardware and software that includes one or more signal processing and/or application-specific integrated circuits.

Each part of the electronic device 100 is described below in detail with reference to FIG. 3.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be independent components, or may be integrated into one or more processors. The controller may be a nerve center and a command center of the electronic device 100. The controller may generate an operation control signal based on instruction operation code and a time sequence signal, to complete control of instruction reading and instruction execution.

A memory may be further disposed in the processor 110, and is configured to store instructions and data. In some embodiments, the memory in the processor 110 is a cache. The memory may store instructions or data just used or cyclically used by the processor 110. If the processor 110 needs to use the instructions or the data again, the processor 110 may directly invoke the instructions or the data from the memory, to avoid repeated access and reduce a waiting time of the processor 110. Therefore, system efficiency can be improved.

When different components are integrated into the processor 110, for example, a CPU and a GPU are integrated, the CPU and the GPU may cooperate to perform an operation prompt method provided in embodiments of this application. For example, in the operation prompt method, some algorithms are executed by the CPU, and the other algorithms are executed by the GPU, so that processing efficiency is high.

In some embodiments, the processor 110 may include one or more interfaces. For example, the interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The display 194 is configured to display an image, a video, and the like. The display 194 includes a display panel. The display panel may be a liquid crystal display (LCD), an organic light-emitting diode (OLED), an active-matrix organic light emitting diode (AMOLED), a flexible light-emitting diode (FLED), a mini-LED, a micro-LED, a micro-OLED, a quantum dot light emitting diode (QLED), or the like. In some embodiments, the electronic device 100 may include one or N displays 194, where N is a positive integer greater than 1.

The internal memory 121 may be configured to store computer executable program code, where the executable program code includes instructions. The internal memory 121 may include a program storage area and a data storage area. The program storage area may store an operating system, an application required by at least one function (for example, a sound playing function or an image playing function), and the like. The data storage area may store data (for example, audio data and an address book) created in a process of using the electronic device 100, and the like. In addition, the internal memory 121 may include a high-speed random access memory, and may further include a nonvolatile memory, for example, at least one magnetic disk storage device, a flash memory device, or a universal flash storage (UFS). The processor 110 runs instructions stored in the internal memory 121 and/or instructions stored in the memory disposed in the processor, to perform various function applications of the electronic device 100 and data processing.

The audio module 170 is configured to convert digital audio information into an analog audio signal output, and is also configured to convert an analog audio input into a digital audio signal. The audio module 170 may be further configured to code and decode an audio signal. In some embodiments, the audio module 170 may be disposed in the processor 110, or some functional modules in the audio module 170 are disposed in the processor 110.

The speaker 170A, also referred to as a "loudspeaker", is configured to convert an audio electrical signal into a sound signal. The electronic device 100 may listen to music or answer a hands-free call by using the speaker 170A.

The microphone 170C, also referred to as "mike" or "mic", is configured to convert a sound signal into an electrical signal. When making a call or sending a voice message, the user may make a sound near the microphone 170C through the mouth, to enter a sound signal to the microphone 170C. At least one microphone 170C may be disposed in the electronic device 100. In some other embodiments, two microphones 170C may be disposed in the electronic device 100, to collect a sound signal and implement a noise reduction function. In some other embodiments, three, four, or more microphones 170C may alternatively be disposed in the electronic device 100, to collect a sound signal, implement noise reduction, and identify a sound source, to implement a directional recording function and the like.

In addition to the foregoing content, as shown in FIG. 2, the electronic device 100 may include an external memory interface 120, an internal memory 121, a universal serial bus (USB) interface 130, a charging management module 140, a power management module 141, a battery 142, an antenna 1, an antenna 2, a mobile communication module 150, a wireless communication module 160, a receiver 170B, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

Although not shown in FIG. 1, the electronic device 100 may further include a Bluetooth apparatus, a positioning apparatus, a flash, a micro projection apparatus, a near field communication (NFC) apparatus, and the like. Details are not described herein.

Based on the foregoing content, an example in which embodiments of this application are applied to the electronic device shown in FIG. 1 is used for description. The following describes the technical solutions in embodiments of this application with reference to the accompanying drawings in embodiments of this application. The terms "first" and "second" below in the descriptions of embodiments of this application are merely used for a description purpose, and shall not be understood as an indication or implication of relative importance or implicit indication of a quantity of indicated technical features. Therefore, a feature limited by "first" or "second" may explicitly or implicitly include one or more features.

An embodiment of this application provides an audio generation solution. An electronic device may convert a text into audio corresponding to the text. The audio corresponding to the text may be formed of one or more song clips. This embodiment of this application is applicable to a plurality of scenarios. For example, this embodiment of this application may be applied to a user signature scenario. A text may be a user signature, and an audio clip is generated from the user signature. In this way, when someone accesses space of the user, the audio corresponding to the user signature may be automatically played. In addition, because the audio corresponding to the signature is formed of one or more song clips, on one hand, the signature is more personalized, and on the other hand, the signature also has a better entertainment effect.

For another example, this embodiment of this application may be further applied to a comment scenario. A text may be a comment of the user on an object, for example, may be a comment of the user on a music-related object such as a song and a playlist. In this case, the electronic device may convert the comment of the user into audio, and play the audio for another user. In this way, compared with a comment in a written form, presenting the comment of the user in a manner of splicing song clips has a better entertainment effect. In addition, the song clips are used to comment on the music-related object such as a song and a playlist, which can further improve an entertainment effect.

For another example, this embodiment of this application may be further applicable to a game scenario. A user may compose a text on the electronic device, and the electronic device generates audio corresponding to the text. Because the audio includes one or more song clips, the electronic device may play the audio of the text for another user, so that the another user can guess which songs are played. This scenario is more suitable for today's variety shows, which can bring a better entertainment effect.

For another example, the electronic device may further convert, with reference to a speech recognition scenario, a piece of speech input by the user into a text, to further perform the solution in this embodiment of this application. Subsequently, the electronic device may further convert the text into the audio corresponding to the text in this embodiment of this application for playing, to be applicable to a voice chat scenario. This makes the chat more interesting.

Figure 4:
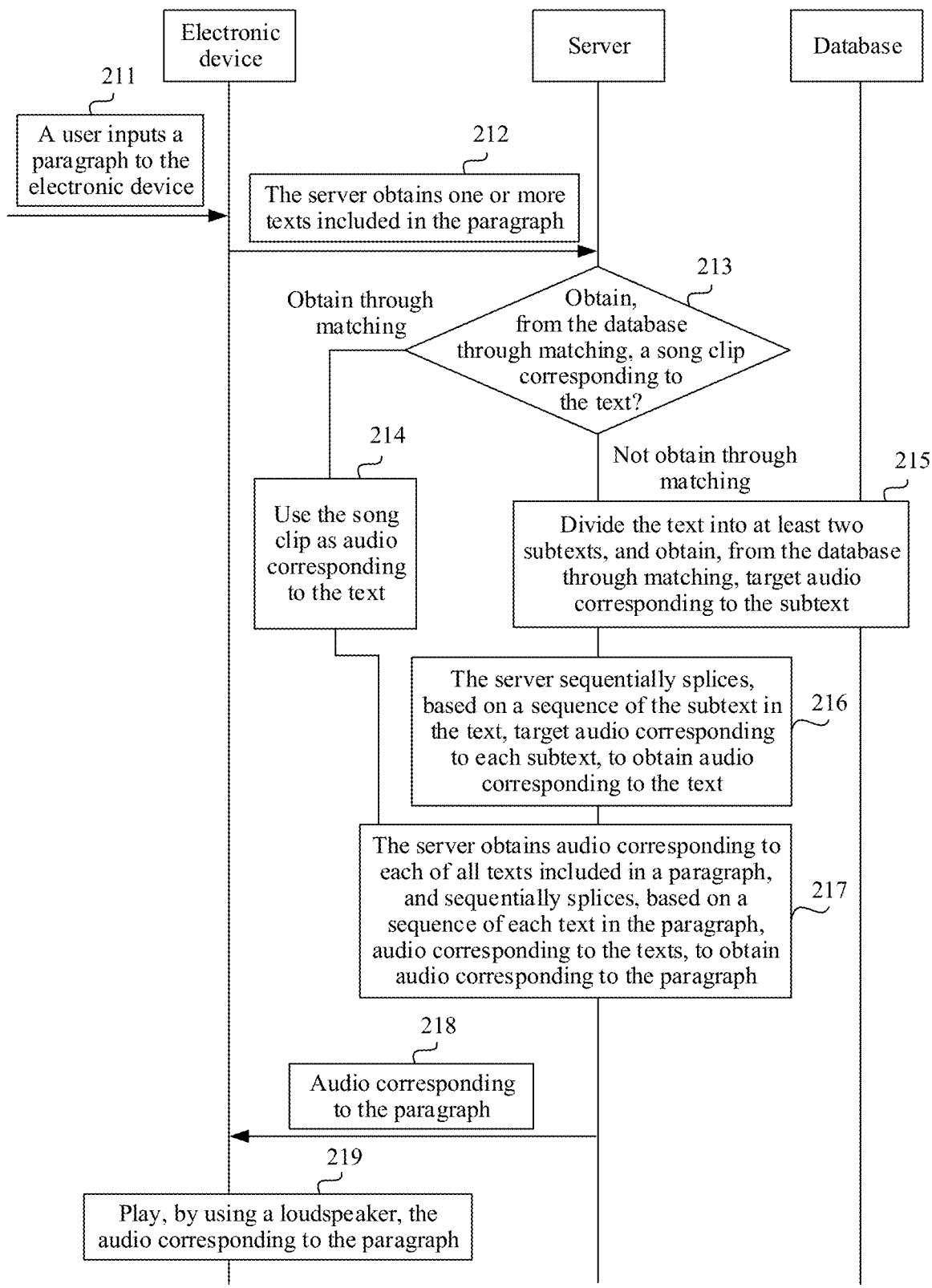
FIG. 4 is a schematic flowchart of an audio generation method according to an embodiment of this application.

FIG. 4 is a schematic flowchart of an example of an audio generation method according to an embodiment of this application. The audio generation method may be completed by an electronic device and a server through exchange. The electronic device may alternatively be a chip or a circuit, for example, a chip or a circuit disposed in an electronic device. The server may alternatively be a chip or a circuit, for example, a chip or a circuit disposed in the server. As shown in FIG. 4, the method may specifically include the following steps.

Step 211: The user inputs a paragraph to the electronic device.

In the step 211, the user may input a paragraph to the electronic device. Specifically, for example, the user clicks the button 190 to implement text input, or text input is implemented by using a touch area on the display 194. The paragraph may include only one text, or may include a plurality of texts. When the paragraph includes a plurality of texts, the plurality of texts are separated by using punctuation marks.

Step 212: The server obtains one or more texts included in a paragraph, and performs a solution of the following step 213 to step 217 for each text.

For example, a paragraph that reads "wo de zu guo, wo ai ni." is obtained. In addition to a period at the end, a comma is further included in the paragraph. Therefore, the content of the paragraph may be divided into two texts by using the comma as a boundary, and the two texts are respectively "wo de zu guo" and "wo ai ni".

The text in this embodiment of this application may include one or more consecutive characters. The characters in the text may include characters in various languages, such as Chinese, English, Arabic, German, and Japanese. A character refers to a character in a corresponding language. For example, when the characters refer to characters in Chinese language, a character may refer to a Chinese character. When the characters refer to characters in English language, a character may refer to an English word.

In the step 212, the electronic device may actively send the text to the server, or the electronic device triggers the server to actively obtain the text.

Step 213: The server performs overall matching on the text, and if a song clip corresponding to the text is obtained through matching, performs step 214, where lyrics of the song clip are the same as characters included in the text; or if no song clip corresponding to the text is obtained through matching, performs step 215.

Step 214: The server uses the song clip as audio corresponding to the text.

Step 215: The server divides the text into at least two subtexts, and the server obtains, from a database through matching, target audio corresponding to the subtext.

In the step 215, there are a plurality of manners of dividing the text into the at least two subtexts, which are described in detail in the following. Details are not described herein again.

In the step 215, the target audio corresponding to the subtext may be a song clip. When the target audio corresponding to the subtext is a song clip, lyrics of the song clip are the same as characters of the subtext. If the subtext includes only one character in the text, a song including the text still cannot be obtained through matching the character. In this case, the character may be read in a manner similar to a human voice by using a speech synthesis technology, and audio that is similar to the human voice and that is obtained by using the speech synthesis technology is the target audio corresponding to the text. In a possible implementation, recordings of some characters may be pre-stored in a voice library, and a recording of the character corresponding to the subtext is obtained through matching from the voice library, to be used as the target audio corresponding to the subtext.

In the step 215, characters included in the two subtexts may be the same, and two song clips corresponding to the two subtexts may be a same song clip from a same song, or may be different song clips from a same song, or may be two song clips from two different songs. For example, "hen ai hen ai ni zhen de hen ai hen ai ni" may be divided into the following subtexts: subtext 1 "hen ai hen ai ni", subtext 2 "zhen de", and subtext 3 "hen ai hen ai ni". The three subtexts may correspond to three pieces of target audio. It can be learned that characters corresponding to the subtext 1 and characters corresponding to the subtext 2 are the same, but target audio corresponding to the subtext 1 and target audio corresponding to the subtext 3 may be a same song clip from a same song, or may be different song clips from a same song, or may be two song clips from two different songs.

In the step 215, there may be one or more databases in this embodiment of this application, and one of the one or more databases may be disposed on the cloud server. The databases may include, for example, a lyrics database that stores lyrics of a song, and may further include, for example, a song popularity database that stores information such as popularity of the song and playback times of the song. The databases may further include, for example, a character locating database. The character locating database includes a plurality of songs. For one of the plurality of songs, the character locating database includes time at which each character in all lyrics of the song appears in the song. The time at which each character appears in the song may be determined based on the character locating database, to obtain a song clip corresponding to the subtext.

Step 216: The server sequentially splices, based on a sequence of the subtext in the text, target audio corresponding to each subtext, to obtain audio corresponding to the text.

Step 217: The server obtains audio corresponding to each of all texts included in a paragraph, and sequentially splices, based on a sequence of each text in the paragraph, audio corresponding to the texts, to obtain audio corresponding to the paragraph.

Step 218: The server sends the audio corresponding to the paragraph to the electronic device.

Step 219: The electronic device may play, by using a loudspeaker, the audio corresponding to the paragraph, to have the user listen to the audio.

Figure 5:
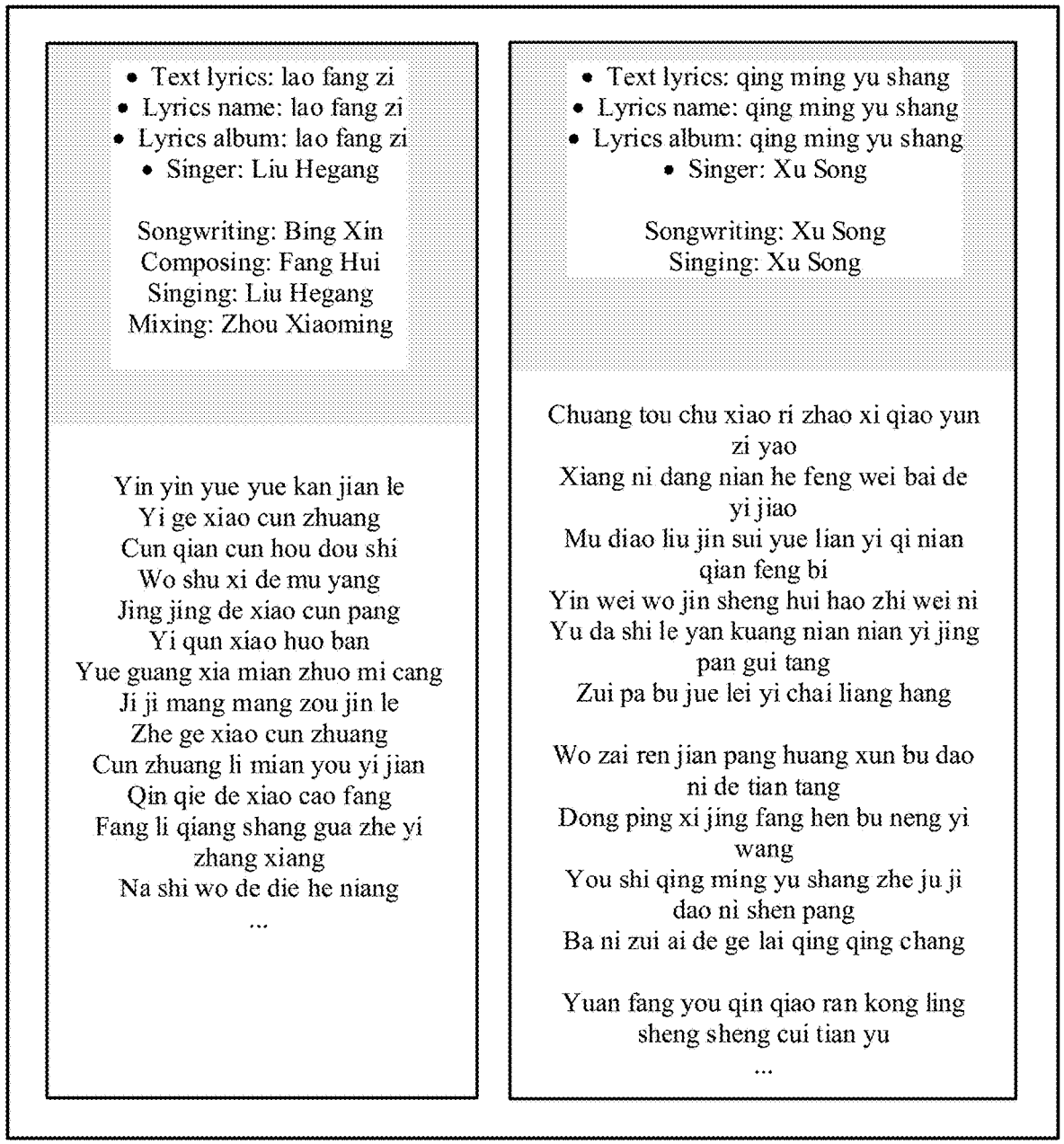
FIG. 5 is a schematic diagram of songs obtained through matching two subtexts according to an embodiment of this application.

The following uses "zhe shi wo zui ai de ge" as an example, and the text is divided into two subtexts: "zhe shi wo" and "zui ai de ge". For each of the two subtexts, a song whose lyrics are the same as the subtext may be obtained through matching from the lyrics database. FIG. 5 is a schematic diagram of an example of songs obtained through matching two subtexts according to an embodiment of this application. A song obtained through matching "zhe shi wo" is "lao fang zi", and a song obtained through matching "zui ai de ge" is "qing ming yu shang". If a song has an identifier in the lyrics database, for example, there may be 1000 songs in the lyrics database, and song identifiers in the lyrics database are sequentially b1 to b1000. It is assumed that an identifier of "lao fang zi" in the lyrics database is b1, and an identifier of "qing ming yu shang" in the lyrics database is b2. As shown in FIG. 5, a lyrics format of each song may be a text divided by sentence.

For each subtext, in the lyrics locating database, time at which each character in the subtext appears in the song is further determined. Alternatively, this may be described as follows: A location at which each character in the subtext appears in the song is determined. FIG. 6 is a schematic diagram of an example of locations at which subtexts appear in lyrics of a song according to an embodiment of this application. As shown in FIG. 6, time at which "zhe shi wo" appears in "lao fang zi" and time at which "zui ai de ge" appears in "qing ming yu shang" may be seen. Further, a song clip corresponding to the subtext may be captured from the song based on the determined time at which the subtext appears in the song. The lyrics database in this embodiment of this application may be a database similar to a Karaoke database that displays lyrics. Then, based on the sequence of the subtext in the text, song clips corresponding to a plurality of subtexts obtained by dividing the text are sequentially spliced, to obtain audio corresponding to the text.

It can be learned that in this embodiment of this application, audio corresponding to a text may be generated, and the audio is formed of one or more song clips. The song clip may refer to a singing clip with accompaniment. This can provide a more personalized audio representation manner. In addition, compared with audio that intentionally mimics human speech in the conventional technology, the audio is formed of a song clip, and a text may be converted into audio formed of a song clip without an objective of being similar to human speech, or without an objective of requiring nature and expressing emotion. This can provide a better audio representation manner. Further, the audio may be more applicable to a service such as a signature, a voice chat, or a competition and a comment that are related to music.

The following describes in detail how to divide the text into the at least two subtexts in the step 215.

In an optional implementation, the text is divided into at least two subtexts according to a preset rule, and the at least two subtexts include a first subtext and a second subtext. The first subtext includes one or more consecutive characters in the text. The second subtext includes one or more consecutive characters in the text except the characters included in the first subtext. In an optional implementation, remaining characters in the text except the last character may be allocated as the first subtext, and the last character in the text may be allocated as the second subtext. If a song clip corresponding to the first subtext is obtained through matching, and a song clip corresponding to the second subtext is obtained through matching, the song clip corresponding to the first subtext and the song clip corresponding to the second subtext are spliced, to obtain the audio corresponding to the text.

In another optional implementation, if no song clip corresponding to the first subtext is obtained through matching, remaining characters in the text except the last two characters are allocated as a third subtext, and the last two characters in the text are allocated as a fourth subtext. If a song clip corresponding to the third subtext is obtained through matching, and a song clip corresponding to the fourth subtext is obtained through matching, the song clip corresponding to the third subtext and the song clip corresponding to the fourth subtext are spliced, to obtain the audio corresponding to the text.

In still another optional implementation, if the song clip corresponding to the first subtext is obtained through matching, but no song clip corresponding to the second subtext is obtained through matching, the second subtext is divided into at least two subtexts, where the at least two subtexts include a fifth subtext and a sixth subtext. If a song clip corresponding to the fifth subtext is obtained through matching, and a song clip corresponding to the sixth subtext is obtained through matching, the song clip corresponding to the first subtext, the song clip corresponding to the fifth subtext, and the song clip corresponding to the sixth subtext are spliced, to obtain the audio corresponding to the text.

In the foregoing several examples, a text is divided into two subtexts, and each subtext is matched. For a subtext, if no song clip is obtained through matching the subtext, the subtext needs to be further divided into at least two subtexts.

Figure 7:
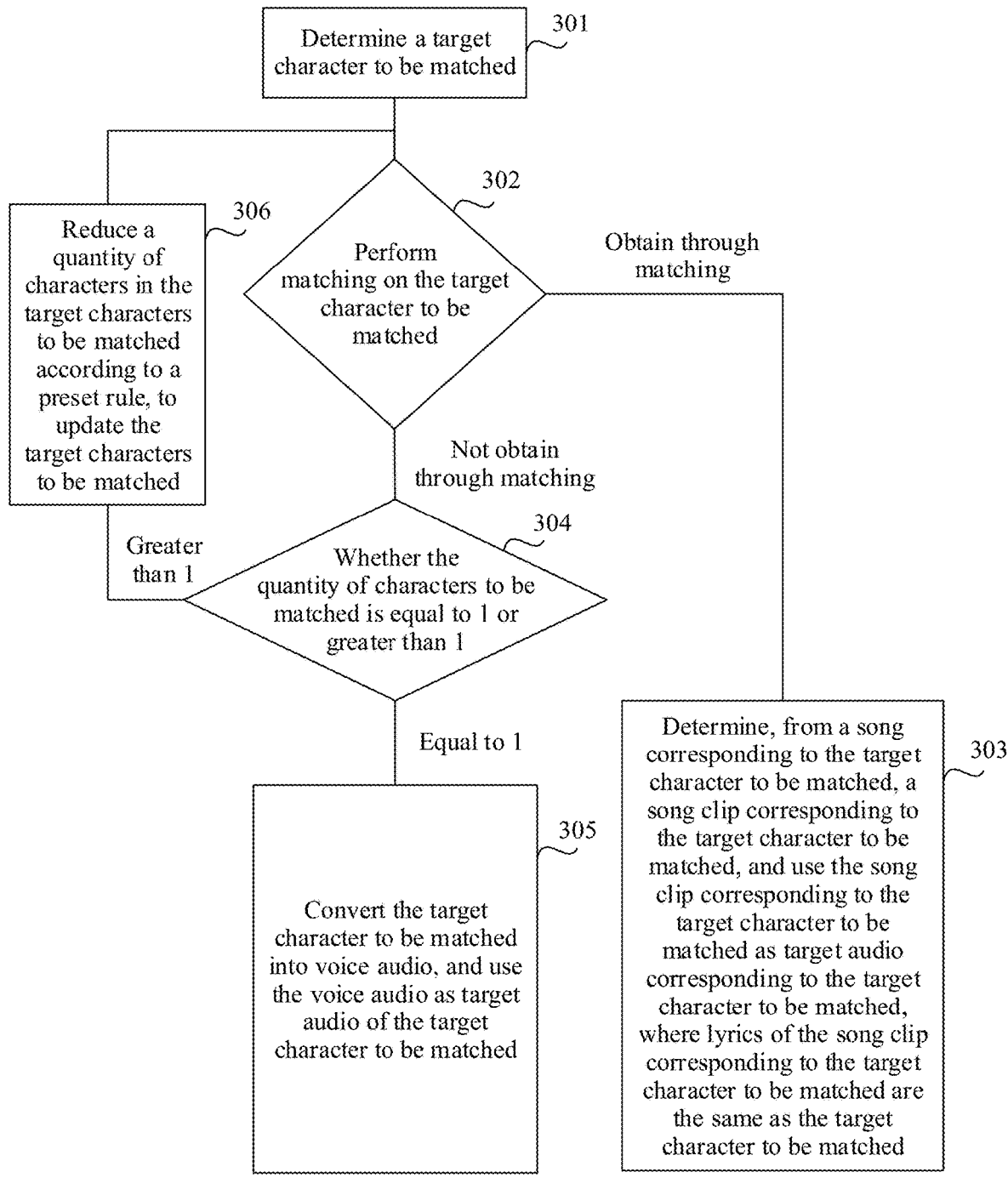
FIG. 7 is a schematic flowchart of another audio generation method according to an embodiment of this application.

The following further describes an optional implementation of dividing a text into subtexts. FIG. 7 is a schematic flowchart of an example of an audio generation method according to an embodiment of this application. As shown in FIG. 7, the method includes the following steps:

Step 301: A server determines a target character to be matched.

The target character to be matched includes one or more consecutive characters for which no target audio is obtained through matching in the text. For example, when the step 301 is performed for the first time, the target character to be matched may be a character other than the last character in the text. In this case, the character other than the last character in the text may be referred to as a first subtext, and the last character may be referred to as a second subtext.

Step 302: The server performs matching on the target character to be matched, and if a song corresponding to the target character to be matched is obtained through matching, performs step 303, or if no song corresponding to the target character to be matched is obtained through matching, performs step 304.

Step 303: a song clip corresponding to the target character to be matched is determined from a song corresponding to the target character to be matched, and the song clip corresponding to the target character to be matched is used as target audio corresponding to the target character to be matched, where lyrics of the song clip corresponding to the target character to be matched are the same as the target character to be matched.

Step 304: The server determines whether a quantity of the target characters to be matched is equal to 1 or greater than 1, and performs step 305 when the quantity of the target characters to be matched is equal to 1, or performs step 306 when the quantity of the target characters to be matched is greater than 1.

Step 305: The server converts the target character to be matched into voice audio, and uses the voice audio as target audio of the target character to be matched.

Step 306: The server reduces the quantity of characters in the target characters to be matched according to a preset rule, to update the target characters to be matched, and performs the step 302.

In the step 306, a subtext for which no song clip is obtained through matching may be further divided into subtexts. For example, if no song clip is obtained through matching the first subtext, characters for which no song clip is obtained through matching may be further divided into a third subtext and a fourth subtext.

In the foregoing described manners of dividing a text into subtexts, the involved reducing the quantity of characters in the target characters to be matched according to a preset rule may include: removing a preset quantity of characters from a tail or a head of the target characters to be matched. For example, the preset rule is to remove one character from the tail of the target characters to be matched, and the entire text is first used as the target characters to be matched. If no song corresponding to the entire text is obtained through matching, one character may be removed from the tail of the text, to obtain updated target characters to be matched. For example, if the target characters to be matched include ten characters, when no corresponding song is obtained through matching the ten characters that are used as a whole, the last character of the ten characters is removed, and the first nine characters are used as updated target characters to be matched. If still no corresponding song is obtained through matching the first nine characters, the last character of the first nine characters is removed, that is, the first eight characters are used as updated target characters to be matched. If a corresponding song is obtained through matching the first eight characters, a song clip corresponding to the first eight characters is used as target audio corresponding to the eight characters, and lyrics of the song clip corresponding to the first eight characters are the same as the first eight characters. In this case, it can be learned that the first eight characters in the ten characters determine corresponding target audio, so that the last two characters remaining in the ten characters may be used as the target characters to be matched in the step 301, to continue to perform the step 302. Alternatively, this may be described as follows: If a character for which no target audio is obtained through matching is a part of characters in the text, one character or a plurality of consecutive characters for which no target audio is obtained through matching in the text are used as the target character to be matched, to perform the step 302.

In another optional implementation of dividing a text into subtexts, the text may be divided into at least two subtexts by using an algorithm. For example, every two words may be allocated as one subtext, or a relatively common word is allocated as one subtext. One character or a plurality of consecutive characters remaining in characters for which no target audio is obtained through matching may also be used as a single subtext.

In still another optional implementation of dividing a text into subtexts, for example, in an optional implementation, a word library may be preset, to preset some relatively common words. Characters in the text are matched with the preset words in the word library. For example, a text is "wo de zu guo wo ai ni", and after matching, it is found that words "zu guo" and "wo ai ni" are preset in the word library. In this case, song clips are matched for "wo de", "zu guo", and "wo ai ni" respectively. If no corresponding song clip is obtained through matching "wo de", in an optional implementation, "wo" and "de" may be separately matched. Alternatively, "wo de" is read in a manner of simulating a human voice.

The foregoing content describes several manners of dividing a text into subtexts. In specific implementation, for a text, there may be a plurality of subtext division manners. Further, for each subtext division manner, a song clip corresponding to the subtext in each subtext division manner is obtained through matching. A subtext division manner may be randomly selected, or a subtext division manner may be selected according to some principles. For example, when there are a plurality of subtext division manners, a division manner in which a quantity of subtexts obtained through division is smallest may be selected. For another example, when there are two subtext division manners, and quantities of subtexts obtained through division in the two subtext division manners are the same, determining may be performed according to popularity or a sum of playback times of songs corresponding to subtexts in each subtext division manner. For another example, there are a plurality of subtext division manners, but in each subtext division manner, there is at least one character for which no song can be obtained through matching. In this case, a subtext division manner may be selected as a final subtext division manner, in which characters for which a song can be obtained through matching has a largest quantity.

For example, "zhe shi wo zui ai de ge" has a plurality of division manners according to an algorithm. For example, two subtexts obtained through division in a division manner 1 are "zhe shi wo" and "zui ai de ge", and two subtexts obtained through division in a division manner 2 are "zhe" and "shi wo zui ai de ge". For the division manner 1, "zhe shi wo" corresponds to a song clip x12 of a song x11, and "zui ai de ge" corresponds to a song clip x22 of a song x21. For the division manner 2, "zhe" corresponds to a song clip y12 of a song y11, and "shi wo zui ai de ge" corresponds to a song clip y22 of a song y21. In this case, the division manner 1 or the division manner 2 may be randomly selected. In another optional implementation, determining may also be performed according to information such as popularity or playback times of a song. For example, a sum of playback times of the song x11 and playback times of the song x21 and a sum of playback times of the song y11 and playback times of the song y21 may be determined, to select a division manner with a larger sum of playback times.

Figure 8:
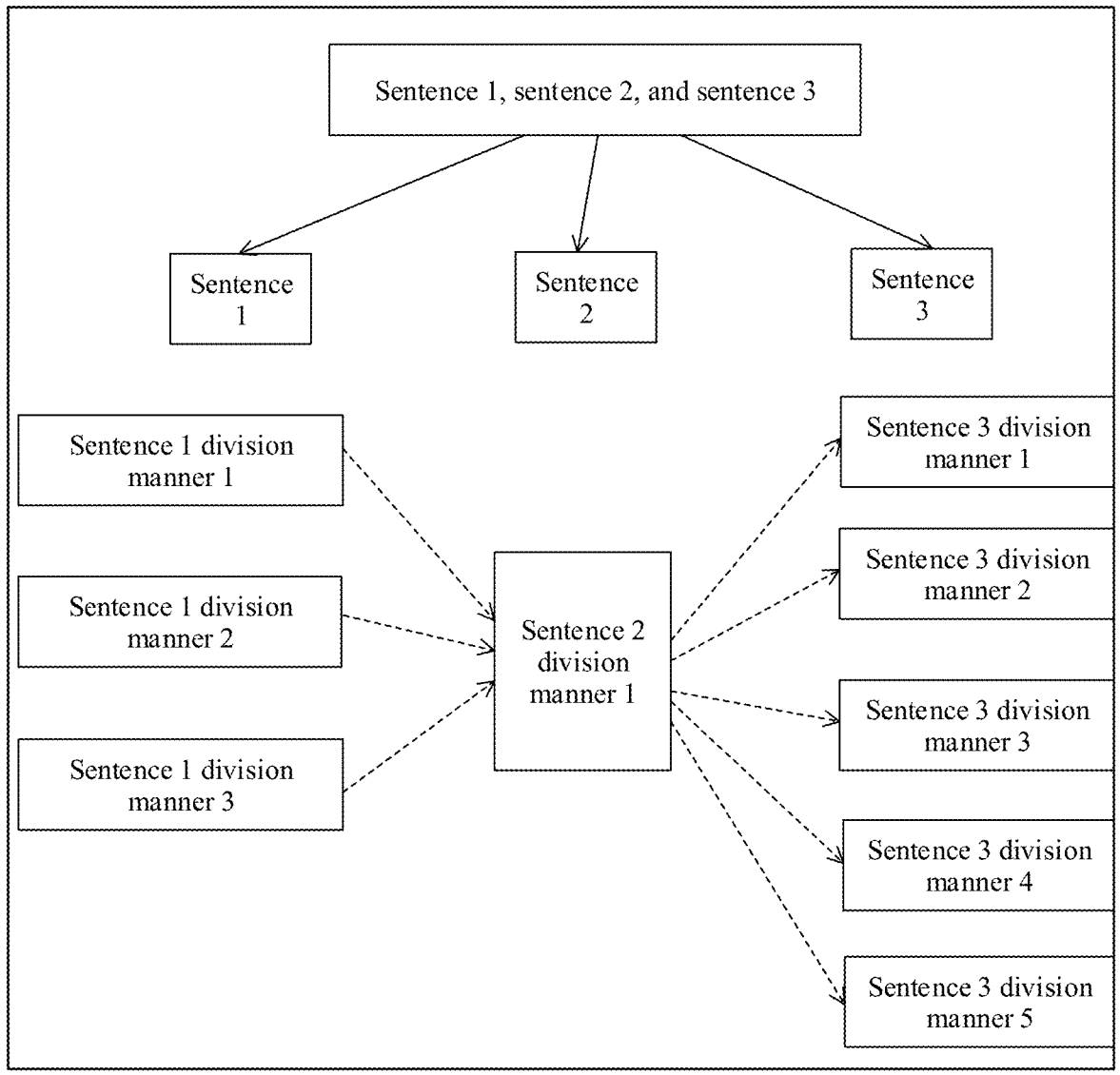
FIG. 8 is a schematic diagram of a solution for processing a paragraph according to an embodiment of this application.

FIG. 8 is a schematic diagram of an example of a solution for processing a paragraph according to an embodiment of this application. As shown in FIG. 8, the paragraph includes three sentences, which are respectively a sentence 1, a sentence 2, and a sentence 3, and each sentence is a text. For each text (each sentence), there may be a plurality of subtext division manners. As shown in FIG. 4, the sentence 1 includes three division manners: a sentence 1 division manner 1, a sentence 1 division manner 2, and a sentence 1 division manner 3, the sentence 2 has one division manner: a sentence 2 division manner 1, and the sentence 3 has five division manners: a sentence 3 division manner 1, a sentence 3 division manner 2, a sentence 3 division manner 3, a sentence 3 division manner 4, and a sentence 3 division manner 5. In this case, for each sentence, a division manner of the sentence may be randomly selected as a final division manner, and audio corresponding to the sentence is determined according to the division manner. Then, based on a sequence of the three sentences in the content of the paragraph, pieces of audio respectively corresponding to the three sentences are sequentially spliced, to obtain audio corresponding to the content of the paragraph.

In the step 213, the following describes for a text, how to select a song clip corresponding to the text when a plurality of songs corresponding to the text are obtained through matching. A person skilled in the art may understand that, in the step 215, for a subtext, when a plurality of songs corresponding to the subtext are obtained through matching, a solution of selecting a song clip corresponding to the subtext from the plurality of songs is similar to a solution of "selecting a song clip corresponding to the text". Details are not described again.

When a plurality of songs corresponding to the text are obtained through matching, in other words, when there are a plurality of songs whose lyrics include the text, one song may be selected from the plurality of songs as a target song according to a preset rule or based on user selection. The preset rule may be related to one or more of the following contents of each of the plurality of songs: playback times, a singer, and a style of the song.

For example, a song with most playback times in the plurality of songs may be determined as a target song corresponding to the text based on the playback times of each of the plurality of songs. The playback times of the song may refer to total playback times since the song goes online, or may refer to playback times of the song in a preset time period, for example, in a recent month. The playback times of the song may be a sum of playback times on a plurality of music apps, or may be an average value of playback times on a plurality of music apps.

For another example, a song that best conforms to personal preference of a user may be matched from a plurality of songs according to the personal preference preset by the user, for example, information such as a song style preferred by the user and a singer preferred by the user. For example, a song whose singer is consistent with the singer most preferred by the user may be obtained through matching and used as the target song corresponding to the text.

For another example, a song list may be generated according to the plurality of songs. The song list includes song names of the plurality of songs. The server sends a request message to an electronic device, where the request message carries indication information indicating the song list. The electronic device displays the song list on the display. The user may select a song most preferred by the user by using the electronic device. The electronic device sends a response message to the server, where the response message carries indication information indicating the target song corresponding to the text. In a possible application scenario, for example, in a competition, the user may select song clips of some unpopular songs corresponding to the text as the target audio of the text, so that the user guesses a song name of the target audio based on the heard target audio.

When the server determines that lyrics of a plurality of song clips in the target song corresponding to the text are the same as the text, a song clip from the plurality of song clips may be selected as the song clip corresponding to the text. For example, a song clip may be randomly selected as the song clip corresponding to the text, or a song clip belonging to a chorus may be selected as the song clip corresponding to the text, and a list may also be provided to the user. The list includes the plurality of song clips, from which a song clip is selected by the user as the song clip corresponding to the text.

It should be noted that, names of the foregoing messages are merely examples. With evolution of communications technologies, the name of any foregoing message may be changed. However, regardless of how the names of the messages change, provided that meanings of the messages are the same as those of the messages in this application, the messages all fall within the protection scope of this application.

The foregoing mainly describes the solutions provided in this application from a perspective of interaction between network elements. It may be understood that, to implement the foregoing functions, each network element includes a corresponding hardware structure and/or software module for implementing each function. A person skilled in the art should easily be aware that, in combination with the units and algorithm steps in the examples described in embodiments disclosed in this specification, the present application may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

Based on the foregoing method and the schematic structural diagram of the server shown in FIG. 2, the following describes solutions executable by the server.

In an optional implementation, the communication interface is configured to input and/or output information. The processor is configured to: obtain a text; obtain, through matching, a song clip corresponding to the text, where lyrics of the song clip are the same as the text; and use the song clip as audio corresponding to the text.

In an optional implementation, the processor is further configured to: if no song clip corresponding to the text is obtained through matching, divide the text into at least two subtexts according to a preset rule, where the at least two subtexts include a first subtext and a second subtext, the first subtext includes one or more consecutive characters in the text, and the second subtext includes one or more consecutive characters in the text except the characters included in the first subtext; obtain, through matching, a song clip corresponding to the first subtext, and obtain, through matching, a song clip corresponding to the second subtext; and splice the song clip corresponding to the first subtext and the song clip corresponding to the second subtext, to obtain the audio corresponding to the text.

In an optional implementation, the processor is specifically configured to: allocate remaining characters in the text except the last character as the first subtext, and allocate the last character in the text as the second subtext.

In an optional implementation, the processor is further configured to: if no song clip corresponding to the first subtext is obtained through matching, allocate remaining characters in the text except the last two characters as a third subtext, and allocate the last two characters in the text as a fourth subtext; obtain, through matching, a song clip corresponding to the third subtext, and obtain, through matching, a song clip corresponding to the fourth subtext; and splice the song clip corresponding to the third subtext and the song clip corresponding to the fourth subtext, to obtain the audio corresponding to the text.

In an optional implementation, the processor is further configured to: if the song clip corresponding to the first subtext is obtained through matching, but no song clip corresponding to the second subtext is obtained through matching, divide the second subtext into at least two subtexts, where the at least two subtexts include a fifth subtext and a sixth subtext; obtain, through matching, a song clip corresponding to the fifth subtext, and obtain, through matching, a song clip corresponding to the sixth subtext; and splice the song clip corresponding to the first subtext, the song clip corresponding to the fifth subtext, and the song clip corresponding to the sixth subtext, to obtain the audio corresponding to the text.

In an optional implementation, the processor is specifically configured to: obtain, through matching, one or more songs corresponding to the text, where lyrics of the song include the text; if there are a plurality of songs, select one song from the plurality of songs as a target song according to the preset rule, or select one song from the plurality of songs as a target song based on user selection; and capture, from the target song, the song clip corresponding to the text.

In an optional implementation, the processor is specifically configured to: select one song from the plurality of songs as the target song based on one or more of the following contents of each of the plurality of songs: playback times, a singer, and a style of the song.

In an optional implementation, the processor is specifically configured to: obtain a paragraph input by a user, where the paragraph includes at least one punctuation mark therein; and divide the paragraph into at least two texts according to the punctuation mark included in the paragraph.

For concepts, explanations, detailed descriptions, and other steps of the electronic device that are related to the technical solutions provided in embodiments of this application, refer to the descriptions of the content in the foregoing method embodiments or other embodiments. Details are not described herein again.

Figure 9:
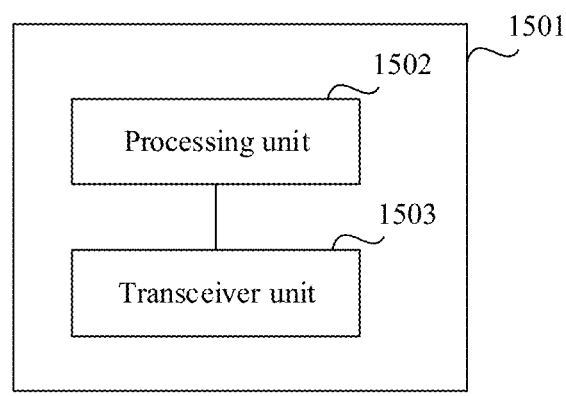
FIG. 9 is a schematic structural diagram of another server according to an embodiment of this application.

Based on the foregoing embodiment and a same concept, FIG. 9 is a schematic structural diagram of a server according to an embodiment of this application. As shown in FIG. 9, the server 1501 may alternatively be a chip or a circuit, for example, a chip or a circuit disposed in the server.

In a possible implementation, the processing unit 1502 is configured to: obtain a text; obtain, through matching, a song clip corresponding to the text, where lyrics of the song clip are the same as the text; and use the song clip as audio corresponding to the text.

For concepts, explanations, detailed descriptions, and other steps of the electronic device that are related to the technical solutions provided in embodiments of this application, refer to the descriptions of the content in the foregoing method embodiments or other embodiments. Details are not described herein again.

It may be understood that, for functions of the units in the server 1501, refer to implementation of corresponding method embodiments. Details are not described herein again.

It should be understood that division into the foregoing units of the electronic device is merely logical function division. In actual implementation, all or some units may be integrated into one physical entity, or may be physically separated. In this embodiment of this application, the transceiver unit 1503 may be implemented by the transceiver, and the processing unit 1502 may be implemented by the processor 1402 in FIG. 2.

Based on the methods provided in embodiments of this application, this application further provides a system, including the server and the electronic device.

Based on the method provided in embodiments of this application, this application further provides a computer program product. The computer program product includes computer program code. When the computer program code is run on a computer, the computer is enabled to perform the method in any one of embodiments on a server side or an electronic device side shown in FIG. 4.

Based on the method provided in embodiments of this application, this application further provides a computer-readable storage medium. The computer-readable storage medium stores program code. When the program code is run on a computer, the computer is enabled to perform the method in any one of embodiments on a server side or an electronic device side shown in FIG. 4.

All or some of the foregoing embodiments may be implemented by using software, hardware, firmware, or any combination thereof. When the software is used to implement embodiments, all or some of embodiments may be implemented in a form of a computer program product. The computer program product includes one or more computer instructions. When the computer program instructions are loaded and executed on a computer, procedures or functions according to embodiments of this application are all or partially generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer storage medium may be any usable medium accessible by a computer, or a data storage device, such as a server or a data center, integrating one or more usable media. The usable medium may be a magnetic medium (for example, a floppy disk, a hard disk drive, or a magnetic tape), an optical medium (for example, a high-density digital video disc (DVD)), a semiconductor medium (for example, a solid state drive (SSD)), or the like.

The network device and the terminal device in the foregoing apparatus embodiments correspond to the network device or the terminal device in the method embodiments. A corresponding module or unit performs a corresponding step. For example, a communication unit (a transceiver) performs a receiving step or a sending step in the method embodiments, and a step other than the sending step and the receiving step may be performed by a processing unit (a processor). For a function of a specific unit, refer to a corresponding method embodiment. There may be one or more processors.

Terminologies such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, an execution thread, a program, and/or a computer. As illustrated by using figures, both a computing device and an application that runs on the computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the Internet interacting with other systems by using the signal).

A person of ordinary skill in the art may be aware that, in combination with illustrative logical blocks (illustrative logical block) described in embodiments disclosed in this specification and steps (step) may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus and method may be implemented in other modes. For example, the foregoing apparatus embodiments are merely examples. For example, division into the units is merely logical function division. During actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, in other words, may be located in one position, or may be distributed on a plurality of network units. Some or all of the units may be selected based on actual requirements to achieve the objectives of the solutions of embodiments.

In addition, functional units in embodiments of this application may be integrated into one processing unit, or each of the units may exist alone physically, or two or more units are integrated into one unit.

When functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in embodiments of this application. The foregoing storage medium includes any medium that can store program code, such as a USB flash drive, a removable hard disk drive, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An audio generation method, applied to a server, comprising:
   obtaining, via a communication interface of the server, a text entered by a user of an electronic device; and
   responsive to not obtaining any song clip corresponding to the text through matching:
   dividing the text into at least two subtexts according to a preset rule, wherein the at least two subtexts comprise a first subtext and a second subtext, wherein the first subtext comprises one or more consecutive characters in the text, and wherein the second subtext comprises one or more consecutive characters in the text except the characters comprised in the first subtext,
   obtaining, from a database through matching, a song clip corresponding to the first subtext and a song clip corresponding to the second subtext, and
   splicing, by a processor of the server, the song clip corresponding to the first subtext and the song clip corresponding to the second subtext to obtain an audio corresponding to the text,
   wherein the obtaining the song clip corresponding to the first subtext and the song clip corresponding to the second subtext comprises:

obtaining, through matching, one or more songs corresponding to the first subtext or the second subtext, wherein lyrics of the song comprise the first subtext or the second subtext;

in response to there being a plurality of songs:
selecting one song from the plurality of songs as a target song according to the preset rule based on playback times of the target song on a plurality of music applications since the target song goes online; and capturing, from the target song, the song clip corresponding to the first subtext or the second subtext.

2. The method according to claim 1, wherein in response to a character comprised in the first subtext being same as a character comprised in the second subtext, the song clip corresponding to the first subtext and the song clip corresponding to the second subtext meet any one of following content:

the song clip corresponding to the first subtext and the song clip corresponding to the second subtext are from two different songs;

the song clip corresponding to the first subtext and the song clip corresponding to the second subtext are two different song clips of a same song; and the song clip corresponding to the first subtext and the song clip corresponding to the second subtext are a same song clip of the same song.

3. The method according to claim 1, wherein the dividing the text into the at least two subtexts according to the preset rule comprises: allocating remaining characters in the text except a last character as the first subtext, and allocating the last character in the text as the second subtext.

4. The method according to claim 1, wherein selecting one song from the plurality of songs as the target song is further based on one or more of following contents of each song of the plurality of songs: a singer and a style of a song.

5. The method according to claim 1, wherein the obtaining the text comprises:
obtaining a paragraph input by a user, wherein the paragraph includes at least one punctuation mark; and
dividing the paragraph into at least two texts according to the punctuation mark included in the paragraph.

6. A server, wherein the server comprises a processor, a memory, and a communication interface, the memory comprises program instructions, and when the program instructions are executed by the processor, cause the server to perform:
obtaining, via the communication interface of the server, a text entered by a user of an electronic device; and
responsive to not obtaining any song clip corresponding to the text through matching;
dividing the text into at least two subtexts according to a preset rule, wherein the at least two subtexts comprise a first subtext and a second subtext, wherein the first subtext comprises one or more consecutive characters in the text, and wherein the second subtext comprises one or more consecutive characters in the text except the characters comprised in the first subtext,
obtaining, from a database through matching, a song clip corresponding to the first subtext and a song clip corresponding to the second subtext, and
splicing, by the processor of the server, the song clip corresponding to the first subtext and the song clip corresponding to the second subtext to obtain an audio corresponding to the text, wherein the obtaining the song clip corresponding to the first subtext and the song clip corresponding to the second subtext comprises:
obtaining, through matching, one or more songs corresponding to the first subtext or the second subtext, wherein lyrics of the song comprise the first subtext or the second subtext;

in response to there being a plurality of songs:
selecting one song from the plurality of songs as a target song according to the preset rule, based on playback times of the target song on a plurality of music applications since the target song goes online; and capturing, from the target song, the song clip corresponding to the first subtext or the second subtext.

7. The server according to claim 6, wherein in response to a character comprised in the first subtext being same as a character comprised in the second subtext, the song clip corresponding to the first subtext and the song clip corresponding to the second subtext meet any one of following content: the song clip corresponding to the first subtext and the song clip corresponding to the second subtext are from two different songs; the song clip corresponding to the first subtext and the song clip corresponding to the second subtext are two different song clips of a same song; and the song clip corresponding to the first subtext and the song clip corresponding to the second subtext are a same song clip of the same song.

8. The server according to claim 6, wherein the dividing the text into the at least two subtexts according to the preset rule comprises: allocating remaining characters in the text except a last character as the first subtext, and allocating the last character in the text as the second subtext.

9. The server according to claim 6, wherein selecting one song from the plurality of songs as the target song is further based on one or more of following contents of each song of the plurality of songs: a singer and a style of a song.

10. The server according to claim 6, wherein the obtaining the text comprises:
obtaining a paragraph input by a user, wherein the paragraph includes at least one punctuation mark; and
dividing the paragraph into at least two texts according to the punctuation mark included in the paragraph.

11. A non-transitory computer-readable storage medium, wherein the non-transitory computer-readable storage medium stores computer-executable instructions, when the computer-executable instructions are invoked by a computer, cause the computer to perform:
obtaining, via the communication interface of the computer, a text entered by a user of an electronic device;
responsive to not obtaining any song clip corresponding to the text through matching;
dividing the text into at least two subtexts according to a preset rule, wherein the at least two subtexts comprise a first subtext and a second subtext, wherein the first subtext comprises one or more consecutive characters in the text, and wherein the second subtext comprises one or more consecutive characters in the text except the characters comprised in the first subtext; and
obtaining, from a database through matching, a song clip corresponding to the first subtext and a song clip corresponding to the second subtext; and
splicing, by the processor of the computer, the song clip corresponding to the first subtext and the song clip corresponding to the second subtext to obtain an audio corresponding to the text, wherein the obtaining the song clip corresponding to the first subtext and the song clip corresponding to the second subtext comprises:

obtaining, through matching, one or more songs corresponding to the first subtext or the second subtext, wherein lyrics of the song comprise the first subtext or the second subtext;

in response to there being a plurality of songs:

selecting one song from the plurality of songs as a target song according to the preset rule, based on playback times of the target song on a plurality of music applications since the target song goes online; and capturing, from the target song, the song clip corresponding to the first subtext or the second subtext.

12. The non-transitory computer-readable storage medium according to claim 11, wherein in response to a character comprised in the first subtext being same as a character comprised in the second subtext, the song clip corresponding to the first subtext and the song clip corresponding to the second subtext meet any one of following content: the song clip corresponding to the first subtext and the song clip corresponding to the second subtext are from two different songs;

the song clip corresponding to the first subtext and the song clip corresponding to the second subtext are two different song clips of a same song; and the song clip corresponding to the first subtext and the song clip corresponding to the second subtext are a same song clip of the same song.

13. The non-transitory computer-readable storage medium according to claim 11, wherein the dividing the text into the at least two subtexts according to the preset rule comprises: allocating remaining characters in the text except a last character as the first subtext, and allocating the last character in the text as the second subtext.

14. The non-transitory computer-readable storage medium according to claim 11, wherein selecting one song from the plurality of songs as the target song is further based on one or more of following contents of each song of the plurality of songs: a singer and a style of a song.

15. The non-transitory computer-readable storage medium according to claim 11, wherein the obtaining the text comprises:

obtaining a paragraph input by a user, wherein the paragraph includes at least one punctuation mark; and dividing the paragraph into at least two texts according to the punctuation mark included in the paragraph.

* * * * *